J. PETRICH.
FILLER FOR EGG CASES.
APPLICATION FILED JULY 3, 1914.

1,165,204.

Patented Dec. 21, 1915.
2 SHEETS—SHEET 1.

Inventor
John Petrich

Witnesses
C. W. P. Newbold
A. E. Johnson

By
Attorney

J. PETRICH.
FILLER FOR EGG CASES.
APPLICATION FILED JULY 3, 1914.
1,165,204.
Patented Dec. 21, 1915.
2 SHEETS—SHEET 2.
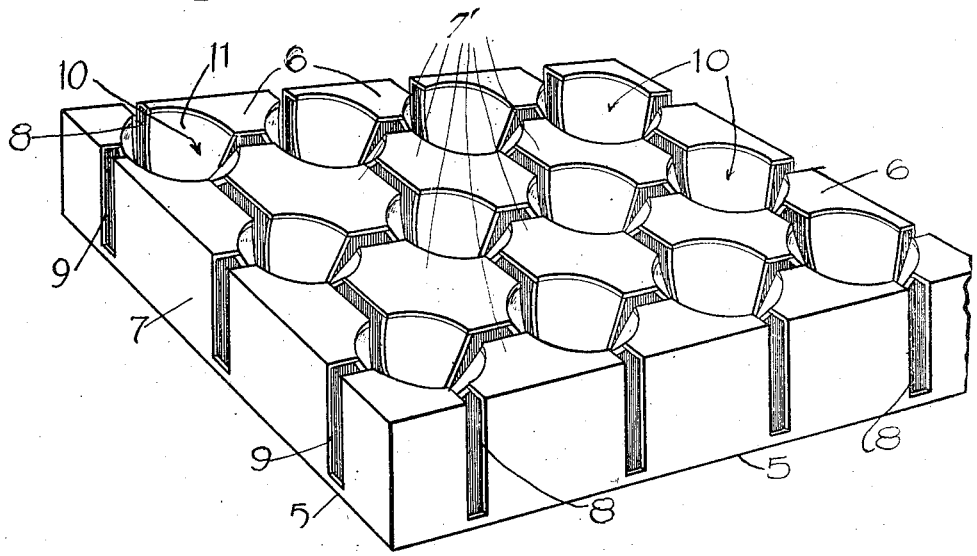
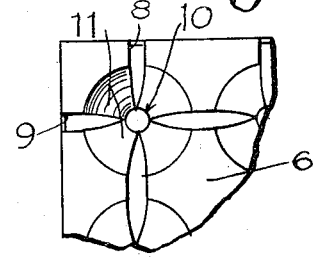
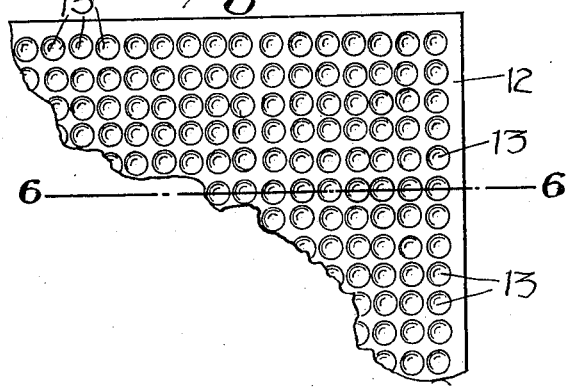
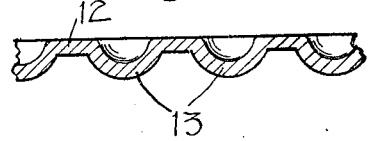
Inventor
John Petrich
Witnesses

UNITED STATES PATENT OFFICE.

JOHN PETRICH, OF YOUNGSTOWN, OHIO.

FILLER FOR EGG-CASES.

1,165,204.
Specification of Letters Patent.
Patented Dec. 21, 1915.

Application filed July 3, 1914. Serial No. 848,816.

*To all whom it may concern:*

Be it known that I, JOHN PETRICH, a citizen of the United States, residing at Youngstown, in the county of Mahoning and State of Ohio, have invented certain new and useful Improvements in Fillers for Egg-Cases; and I do hereby declare the following to be a full, clear, and exact description of the invention, such as will enable others skilled in the art to which it appertains to make and use the same.

This invention relates to new and useful improvements in fillers for use within cases when shipping eggs or other fragile articles, the filler being so constructed as to insure against breakage of the articles.

Another object of the invention is to provide a filler for egg cases, which is preferably formed of soft paper, known as cotton rag paper, or a similar substance, and which is formed with a plurality of cells in which the articles packed, are received.

Another object of the invention is to provide a filler, which when used in connection with an egg case, will render the case especially adapted for shipment by parcel post.

With these and other objects in view as will become more apparent as the description proceeds, the invention consists in certain novel features of construction, combination and arrangement of parts as will be hereinafter more fully described and claimed.

Figure 1:
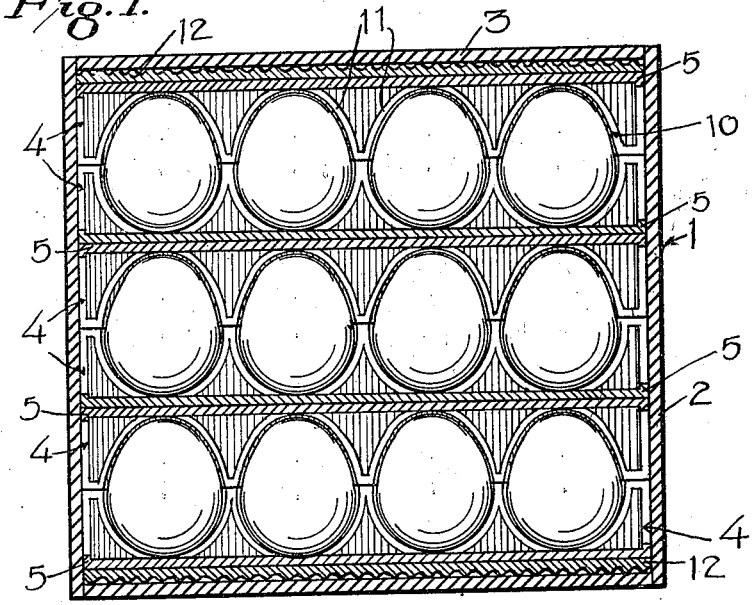
Figure 2:
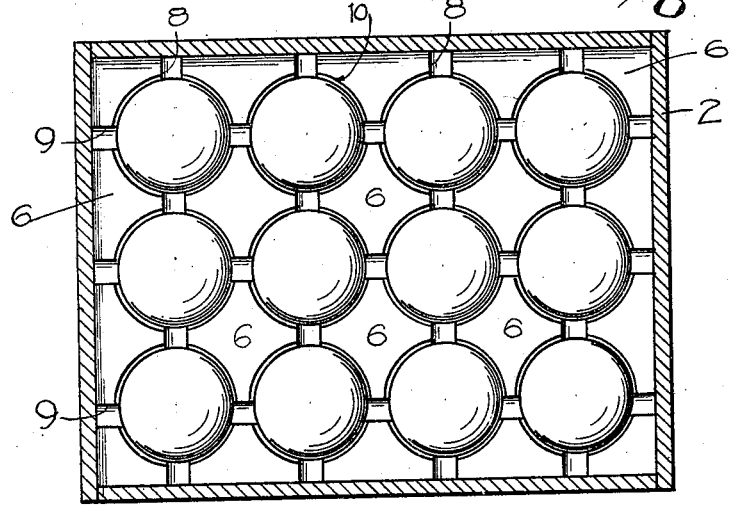

For a complete understanding of my invention, reference is to be had to the following description and accompanying drawings, in which, Figure 1 is a vertical sectional view through an egg case having my fillers packed therein, Fig. 2 is a horizontal sectional view, Fig. 3 is a perspective view of the filler, Fig. 4 is a fragmentary plan view of the filler, Fig. 5 is a fragmentary view, illustrating a portion of a cushioning pad used in an egg case, and Fig. 6 is a section taken on the plane of line 6—6 of Fig. 5.

Referring in detail to the drawings by numerals, 1 designates, generally, an egg case having a body 2 and a top or cover 3.

In carrying out my invention, I provide a filler designated as an entirety by the numeral 4, and consisting of a hollow body rectangular in cross section and plan. This body includes a base or outer wall 5, an inner wall 6, and side walls 7. The body is divided into a plurality of cushioning elements 7' by slotting the inner wall transversely and longitudinally as indicated by the numerals 8 and 9. The side walls are likewise provided with transverse slots which extend to a point near the outer wall and register with the slots 8 and 9. A plurality of cells 10 are formed by cutting away the meeting corners of the cushioning elements and providing a plurality of cell walls 11 which join the top wall 6 of the filler with the base or outer wall 5. In the present instance, I have shown the cells 10 of a substantially semicircular shape and the cell walls 11 of a somewhat segmental shape, and it will be noted upon reference to Figs. 3 and 4, that the walls forming each cell are spaced from one another.

12 designates a cushioning pad which I use in connection with my improved fillers, and this pad is provided with a plurality of protuberances 13 on one side thereof to space the body of the pad from its supporting surface.

In packing the case 1, a pad 12 is first placed therein with the protuberances 13 engaging the bottom of the case. Then a filler is placed against the pad with the cells 10 opening upwardly. Eggs are then placed in the cells and a second filler placed over the eggs to receive the portions thereof which project above and which are not protected by the first-mentioned filler. It will be apparent that eggs, when packed in this fashion, are adequately protected against breakage because of shock and jars to which the case may be subjected.

It is to be understood that the space of the cells may be varied at will, so that articles other than eggs may be packed between the fillers.

While I have shown and described the preferred embodiment of my invention, it will be understood that minor changes in construction, combination and arrangement of parts may be made without departing from the scope and spirit of the invention as claimed.

Having thus described my invention, I claim:

1. A filler of the character described comprising a hollow body having an inner wall, an outer wall, and side walls connecting the inner and outer walls, the inner wall being formed with a plurality of openings, a plurality of cell-forming walls extending from the edges of said openings to the outer wall, the inner wall and side walls being formed with slots which divide the body into a plurality of cushioning elements.

2. A filler of the character described comprising an outer wall, an inner wall, and side walls connecting the inner and outer walls, the inner wall being formed with a plurality of circular openings and provided with a plurality of slots connecting said openings, the slots extending longitudinally and transversely of the inner wall and meeting transverse slots formed in the side walls, and a plurality of cell forming walls connecting the edges of the openings with the outer wall.

In testimony whereof I affix my signature in presence of two witnesses.

JOHN PETRICH.

Witnesses:
ARTHUR YENNY,
WILLIAM YENNY.